United States Patent
Müller et al.

(10) Patent No.: US 7,291,802 B2
(45) Date of Patent: *Nov. 6, 2007

(54) JOINING SYSTEM HEAD, JOINING SYSTEM, AND METHOD OF FEEDING AND JOINING ELEMENTS

(75) Inventors: Manfred Müller, Rechtenbach (DE); Wolfgang Obermann, Grünberg (DE); Michael Krengel, Giessen (DE); Klaus Gisbert Schmitt, Giessen (DE)

(73) Assignee: Newfrey LLC, Newark, DE (US)

( * ) Notice: Subject to any disclaimer, the term of this patent is extended or adjusted under 35 U.S.C. 154(b) by 512 days.

This patent is subject to a terminal disclaimer.

(21) Appl. No.: 10/436,894

(22) Filed: May 13, 2003

(65) Prior Publication Data

US 2004/0037634 A1 Feb. 26, 2004

(30) Foreign Application Priority Data

May 16, 2002 (DE) ................. 102 23 154

(51) Int. Cl.
*B23K 11/04* (2006.01)
(52) U.S. Cl. .......................... 219/99; 219/98
(58) Field of Classification Search .............. 219/8, 219/99, 98, 127
See application file for complete search history.

(56) References Cited

U.S. PATENT DOCUMENTS

| | | | |
|---|---|---|---|
| 2,549,804 A | 4/1951 | Graham | |
| 2,727,123 A | 12/1955 | Gregory, Jr. | |
| 2,790,066 A | 4/1957 | Haynes et al. | |
| 3,495,066 A | 2/1970 | Broyard et al. | |
| 3,989,920 A | 11/1976 | Masubuchi et al. | |
| 4,306,137 A | 12/1981 | Shoup et al. | |
| 4,620,079 A * | 10/1986 | Allmann et al. | 219/98 |

(Continued)

FOREIGN PATENT DOCUMENTS

DE 44 00 350 7/1995

(Continued)

OTHER PUBLICATIONS

European Patent Office Search Report for 03010431, 4 pages, dated Sep. 2, 2003.

(Continued)

*Primary Examiner*—Len Tran
(74) *Attorney, Agent, or Firm*—Harness, Dickey & Pierce, P.L.C.

(57) ABSTRACT

A joining system head (22) is proposed for fixation to a movable frame (12), in particular to a robot (12), having
a holding means (66) for an element (36) to be joined to a part (38),
a joining drive means (64) to move the holding means (66) along a joining direction (40) for joining, and
a feeding means (44) for feeding elements (36) to the joining system head (22).

Here a control means (42) to control the joining drive means (64) is arranged at the joining system head (22) spatially distanced from the holding means (66) and the joining drive means (64), so that the holding means (66) and the joining drive means (64) form a joining tool (32) of small dimensions, and means (68) are provided to pass on the elements (36) fed to a transfer station (46) of the feeding means (44) in each instance to the holding means (66) from in front.

71 Claims, 7 Drawing Sheets

U.S. PATENT DOCUMENTS

| | | | |
|---|---|---|---|
| 4,792,655 A * | 12/1988 | Ettinger | 219/98 |
| 5,068,511 A * | 11/1991 | Meyer, Sr. | 219/98 |
| 5,171,959 A | 12/1992 | Schmitt et al. | |
| 5,252,802 A | 10/1993 | Raycher | |
| 5,317,123 A | 5/1994 | Ito | |
| 5,317,124 A | 5/1994 | Lesser et al. | |
| 5,321,226 A | 6/1994 | Raycher | |
| 5,349,152 A | 9/1994 | Renner | |
| 5,502,291 A | 3/1996 | Cummings | |
| 5,813,114 A | 9/1998 | Blacket et al. | |
| 5,938,945 A | 8/1999 | Hofmann et al. | |
| 5,938,946 A | 8/1999 | Kurz | |
| 5,977,506 A | 11/1999 | von Daniken | |
| 5,981,896 A | 11/1999 | Keanini et al. | |
| 6,060,690 A | 5/2000 | Tyagi | |
| 6,215,085 B1 | 4/2001 | Cummings et al. | |
| 6,388,224 B1 * | 5/2002 | Torvinen | 219/99 |
| 6,968,939 B1 | 11/2005 | Mauer et al. | |
| 2003/0141347 A1 | 7/2003 | Citrich et al. | |

FOREIGN PATENT DOCUMENTS

| | | |
|---|---|---|
| EP | 0 715 924 | 6/1996 |
| GB | 2 285 405 | 7/1995 |
| WO | WO 00/78495 | 12/2000 |
| WO | WO 01/6246 | 8/2001 |

OTHER PUBLICATIONS

Neue Tucker Technologie. Bolzenschweiβen mit System!; dated Sep. 1999 (Brochure in German with translation brochure attached).
Bolzenschweiβen Grundlagen und Anwendung by Trillmich, Welz, Fachbuchreihe Schweiteβchnik, DVS Verlag, 1997, Chaper 9.3.

* cited by examiner

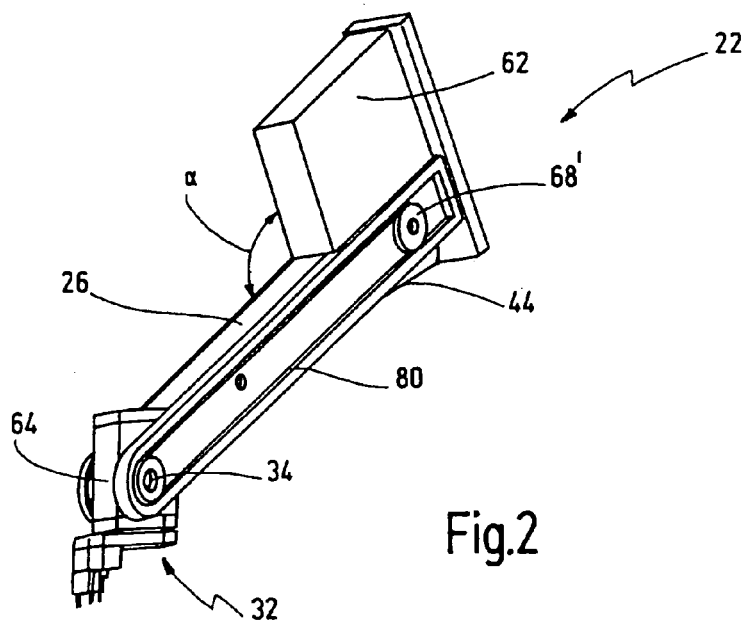
Fig.2
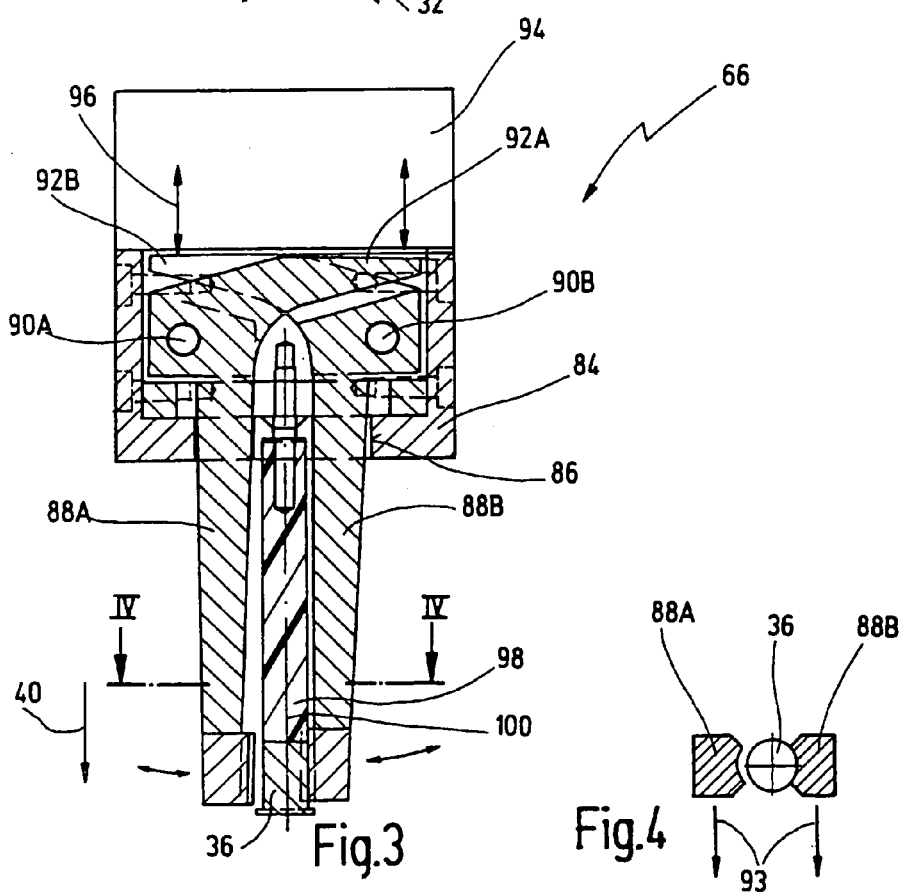
Fig.3
Fig.4

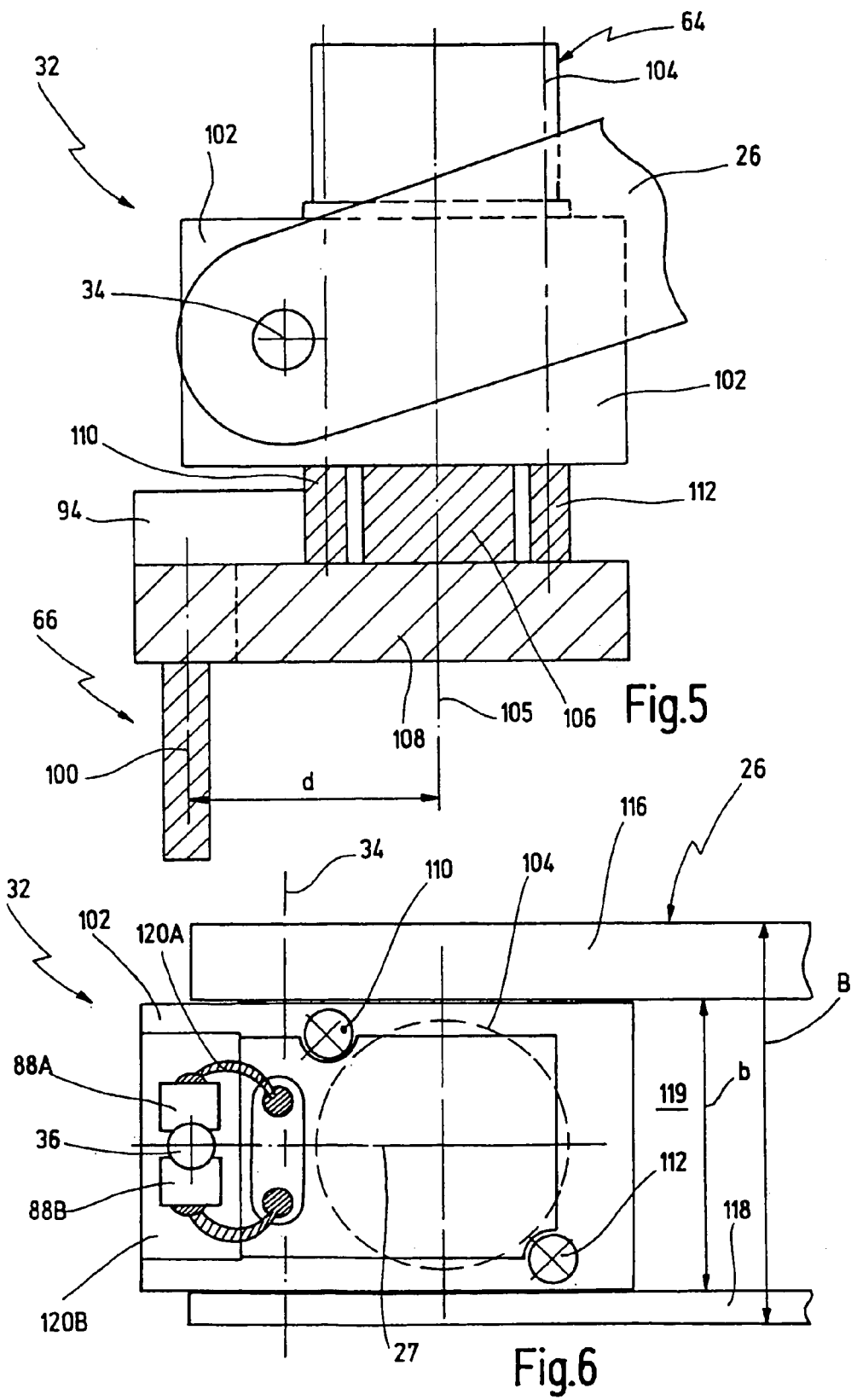

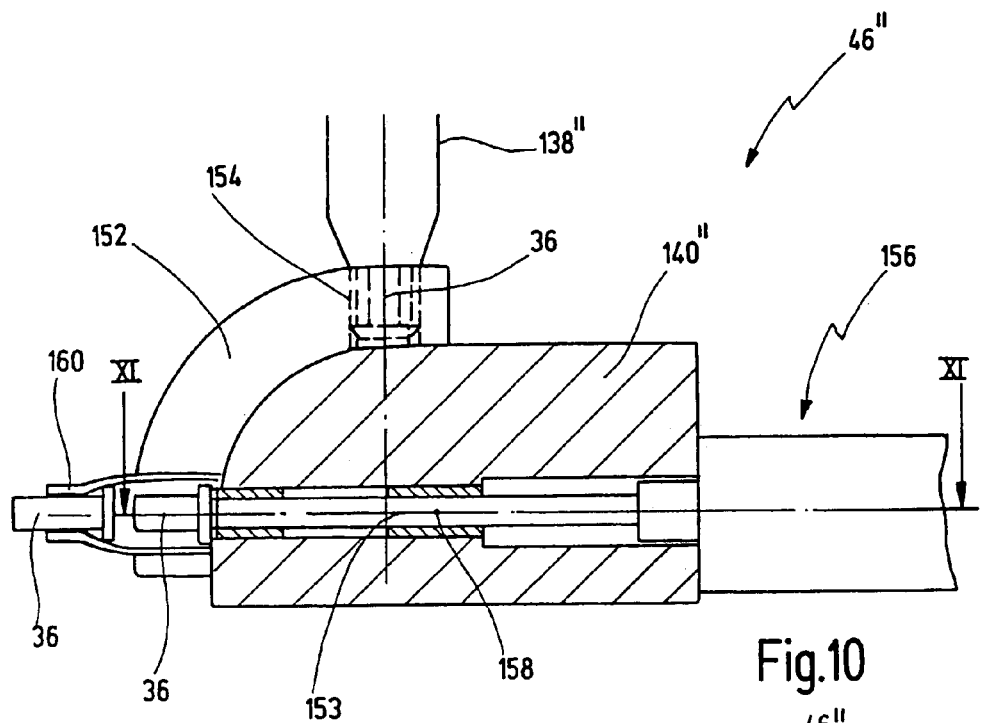
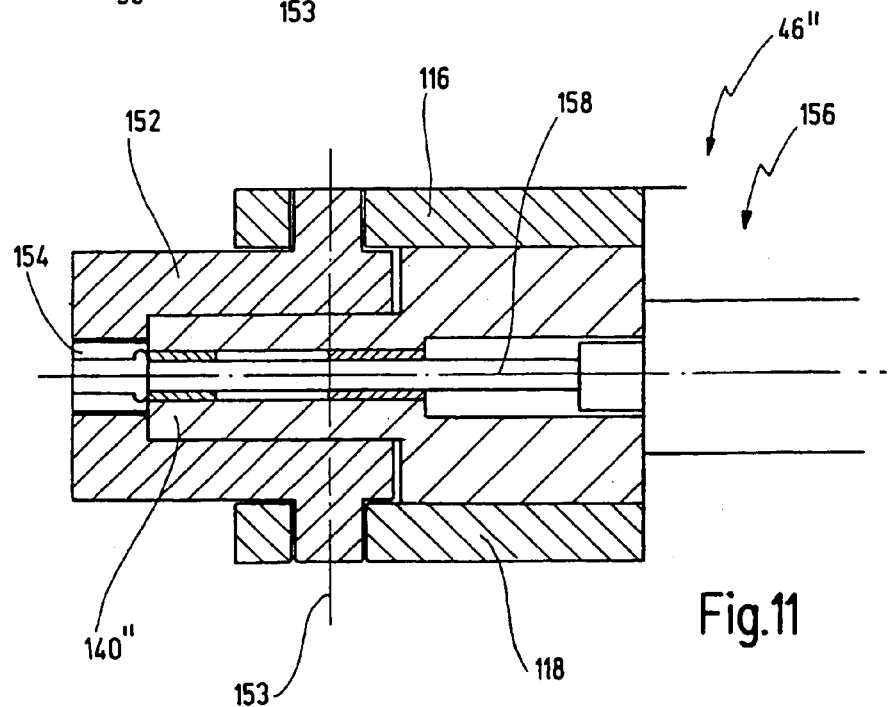

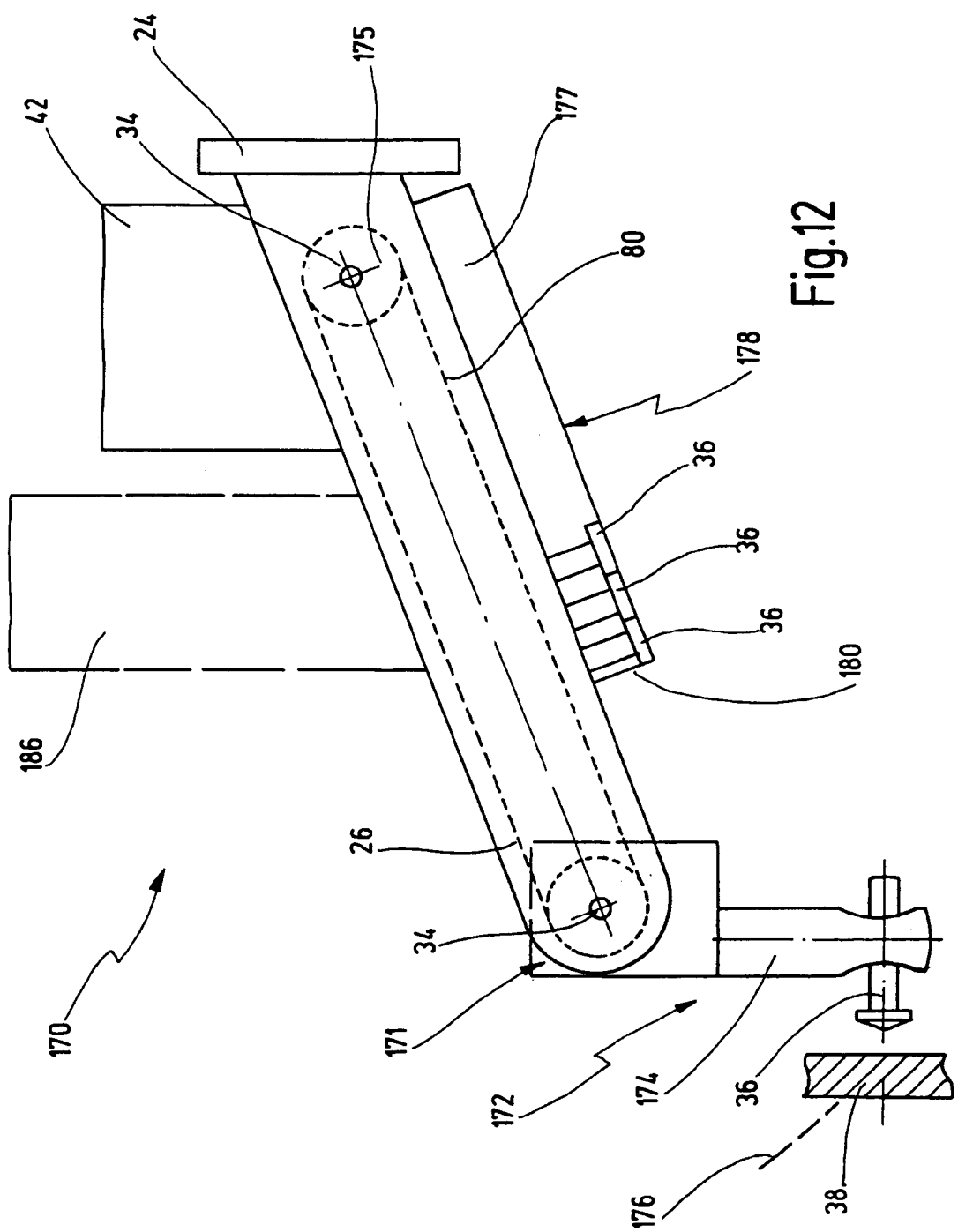

JOINING SYSTEM HEAD, JOINING SYSTEM, AND METHOD OF FEEDING AND JOINING ELEMENTS

BACKGROUND AND SUMMARY OF THE INVENTION

The present invention relates to a joining system head for attachment to a movable frame, in particular to a robot, having
- A holding means for an element to be joined to a part, and
- A joining drive means to move the holding means along a joining direction for joining.
- A feeding means for feeding elements to the joining system head.

The present invention relates further to a joining system having a robot movable on at least two coordinate axes and a joining system head attached to the robot. Lastly, the present invention relates to a method of feeding elements from a stationary unit to a movable joining system head and joining said elements to parts by means of the joining system head.

Such a joining system head, such a joining system and such a method of feeding and joining elements by means of a joining system head are generally known. The term 'joining' in the present context is intended to refer to all ways of connecting elements to parts, in particular connections of metal elements to metal parts, for example by bonding, forming, as for example riveting, or by union of matter, as for example welding, including short-time arc welding. Short-time arc welding is often referred to as bolt welding, even though it is not exclusively bolts that are welded. A current system of bolt welding in industrial use, in combination with a robot, is known in the brochure "Neue TUCKER Technologie. Bolzenschweißen mit System!," Emhart TUCKER, 9/99.

Bolt welding finds application chiefly, but not exclusively, in vehicular technology. Here, metal elements such as metal bolts, with or without threads, eyes, nuts etc., are welded onto the sheet metal of the bodywork. The metal elements then serve as anchors, or fastening elements, to fix for example interior fittings, lines and the like to the sheet metal of the body. At the joining system head, disclosed in the above-mentioned Emhart TUCKER publication, the joining drive means is configured either as a linear electric motor or as a combination of a lift magnet and a spring.

The holding means is constituted by a one-piece tongs elastically expandable in radial direction. The elements are as a rule welding bolts comprising a head having a somewhat larger diameter than the shank of the bolt. In the known system, the bolts are fed to the welding head by way of suitable feeding conduits by means of compressed air. The bolts are thus fed 'head first' into the tongs from behind. Ordinarily the bolt will strike the tongs from the inside, but without passing through it. A loading pin provided coaxial with the tongs is then actuated to propel the bolt thus fed through the tongs. The tongs are elastically expanded radially when the head of the bolt passes through. Then the tongs snap closed elastically around the shank of the bolt and hold it fast in the position determined by the travel of the pin.

The joining drive means in the form of a linear motor (or lift magnet/spring combination) has a travel of a few millimeters. Also, the welding head is fixed at the end of an arm of the robot, usually by way of a pneumatic or hydraulic carriage. That is, the entire welding head is movable in a direction parallel to the welding axis by means of the carriage, which has a considerably greater travel than the linear motor. The welding head further comprises a control means to control the linear motor and the loading pin, provided spatially separate from the welding head, more specifically in a stationary feeder.

To perform a welding operation, first the robot is programmed so that it travels into a predetermined position in which the carriage and linear motor axes are perpendicular to the sheet metal onto which the bolt is to be welded. The bolt is prestressed so that it protrudes vis-à-vis a supporting foot. Then the carriage is actuated until the foot meets the sheet metal. The bolt held in the holding means then rests in contact with the sheet metal. Next comes a determination of the zero line of the holding means with respect to the sheet metal. Alternatively, however, there are methods of zero line determination that dispense with the supporting foot.

Then, in the case of welding with supporting foot, an electric pre-current is switched on, passing through the bolt and the part. The bolt is then lifted relative to the part by means of the linear motor (lifting means). An electric arc is set up. Then a switch is made to the welding current. By the high welding current, the opposed faces of bolt and part begin to be fused. The bolt is then lowered onto the part again, so that the respective melts will mingle. Upon attainment of the part and the short circuit of the arc, or just before, the welding current is switched off. The entire melt solidifies and the welded connection is complete.

Now the welding head is drawn off from the welded-on bolt, using the carriage. The carriage is necessary because, among other reasons, the drawing-off motion must take place exactly on the centerline of the welded-on bolt. Otherwise, owing to the one-piece tongs, there would be danger of damage to the bolt and/or the tongs. The robot arm alone is not capable of such a precise linear motion in an arbitrary direction of space. For owing to the superposition of the simultaneous regulation of several components of robot arm motion, as required for this purpose, such linear motions can be executed by the robot with a certain amount of undulation only. The known welding head comprises a comparatively great axial extent. Since moreover the welding head must be drawn off from the bolt in axial direction, use of the welding head in places of difficult access is possible only within limits.

Then there are developments for employing robot technology to feed the bolt. Here a separate pick-up takes pre-sorted bolts and brings them to the welding location. This is disclosed in "Bolzenschweißen. Grundlagen und Anwendung" by Trillmich, Welz, Fachbuchreihe Schweißtechnik, DVS Verlag, 1997, Chapter 9.3. It is there explained that this technology lends itself especially to headed bolts that, because of their size and shape, cannot be blown through hoses. This type is referred to as the "pick-up system."

Further, a welding head by the firm of Nelson has been disclosed, in which a lift device moves a carrier projecting laterally arm-like up and down. At the terminal portion of the carrier, a holding means with tongs is rigidly mounted. The bolts are fed, as in the case of the TUCKER welding head described above, to the tongs from behind, by means of a compressed air hose extending through the carrier. The end portion of the carrier with holding device fixed thereto is more readily positioned at inaccessible locations. The lift device to move the projecting arm and the pertinent control means are arranged in the initial portion of the carrier.

Against this background, the object of the invention consists in specifying an improved joining system head, an improved joining system and an improved method of feeding and joining fed elements. This object is accomplished, for the joining system head initially mentioned, in that a control means to control the joining drive means is arranged at the joining system head spatially separate from the holding means and the joining drive means, so that the holding means and the joining drive means form a joining tool of small dimensions, and in that means are provided to pass on the elements fed to a transfer station of the feeding means to the holding means in front in each instance.

The joining system head according to the invention represents a completely novel concept. This is based on two fundamental ideas. One of these ideas consists in providing the control means at the joining system head, but spatially distanced from the holding means and the joining drive means. The holding means and the joining drive means can consequently form a joining tool of small dimensions and not much interference edge relevance. The other idea consists in feeding the elements by means of the feeding means, not immediately all the way to the holding means, but as far as a transfer station likewise distanced from the joining tool. In addition, means are provided to pass on each of the elements fed to the transfer station to the holding means from in front. In this way it is possible to keep the over-all axial length of the joining tool small, since no loading pin is required to position the elements through the holding means from behind.

Since the joining drive means and the holding means are integrated into a joining tool, no transmission of a lifting motion over long distances (cantilever arm or the like) is needed. Consequently the positioning and the actual joining or welding can take place locally with high precision. In the joining system according to the invention, the above object is accomplished in that a joining system head according to the invention is fixed to the robot arm.

The method according to the invention for feeding elements from a stationary unit to a movable joining system head and joining fed elements to parts by means of the joining system head contains the steps of feeding an element from the stationary unit to the movable joining system head while the joining system head is joining an already fed element to a part. According to the invention, the elements are not conveyed from the stationary unit all the way to the holding means in one step as in the prior art. Instead, the elements are at first fed from the stationary unit only as far as the transfer means. This feeding step can accordingly take place while the joining welding head itself is joining an already fed element to a part. By virtue of this partial processing, shorter cycle times are obtainable over all. The object has thus been completely accomplished.

It is of especial advantage if the joining tool is mounted on an end portion of a projecting elongated carrier. The spatial distance between joining tool and control means is consequently attained by the elongated carrier. This makes it possible to bring the joining tool to inaccessible locations through openings.

Here it is especially preferred if the joining tool is movably mounted on the end portion of the carrier and if a loading drive means is designed to move the joining tool to the transfer station in order to pass an element on to the holding means. In this embodiment, it is especially advantageous that the movable mounting of the joining tool creates an additional degree of freedom for positioning the same. For example, the joining tool, when it has already been introduced into a cavity by means of the carrier, can still be moved. This permits flexible "handling." Further, the movable mounting of the joining tool makes it possible for the means of passing an element on from the transfer station to be realized by the mobility of the joining tool. The joining tool consequently in each instance itself 'fetches' the elements to be joined from the transfer station.

Further, it is preferred in this embodiment if the joining tool is rotatably mounted on the end portion of the carrier and if the loading drive means is designed to rotate the joining tool as far as the transfer station. A rotatability of the joining tool on an end portion of the carrier is comparatively simple to achieve as a matter of design. Rotatability as a single degree of freedom is sufficient for numerous applications. When it is considered that the carrier itself is also rotatable about its lengthwise axis by means of the robot as a rule, and arbitrarily positionable in space, joining operations can be carried out even in highly inaccessible locations. The interference edge profile of the joining tool is determined by the necessary radius of swing.

The loading drive means serves generally, in the first place, to fetch one element at a time from the transfer station, and in the second place, also to position the joining tool relative to the carrier in a welding position. It will be understood that the variability will be greater the greater the angular range within which welding positions can be arranged by the loading drive means.

According to an alternative embodiment, the loading drive means comprises a motor arranged at the end portion of the carrier. In this embodiment, a precise control of the joining tool can be achieved with good response behavior.

In an alternative embodiment, the loading drive means comprises a motor arranged in the neighborhood of the control means and a transmission that transmits motions of the motor to the joining tool. In this embodiment, an improved interference edge clearance results, since the interference-edge relevant end portion of the carrier does not comprise any motor of its own to move the joining tool. Rather, the comparatively bulky motor is arranged in the neighborhood of the control means and transmits its motion to the joining tool by way of a transmission.

Here it is especially preferred if the motor is a rotary motor, in particular an electric motor, and if the transmission is a transmission with tension means. With a rotary motor, motions can be executed precisely and with high responsiveness. With the tension transmission, comparatively great distances between the neighborhood of the control means on the one hand and the end portion of the carrier on the other hand can be achieved by comparatively simple design.

Upon the whole, it is of advantage if the joining drive means consists of a linear electric motor. In this embodiment, the joining drive means is configured as a lift means. A linear electric motor requires only relatively few lines to trigger it, and can be regulated in both lift directions.

Here it is of especial advantage if the longitudinal axis of the joining drive means and the longitudinal axis of the holding means are distanced parallel to each other. In this embodiment, it is possible so to position the holding means that even welding positions close to edges are attainable. The distance between the longitudinal axes may be in the range of some few centimeters, just enough to shift the holding means out of the projection of the joining drive means in joining direction.

According to a further preferred embodiment, the holding means comprises a plurality of jaws arranged distributed around the longitudinal axis of the holding means and movable towards and away from each other, in order to hold or release an element, according to the case. Here it is especially preferred if the holding means comprises two jaws. The term 'jaws' in the present context is to be understood broadly. The jaws may for example be elongated fingers. With two fingers, rotationally symmetrical or approximately rotationally symmetrical parts in particular can be grasped with comparative convenience and held securely.

It is preferred if the jaws are movable far enough away from each other so that the holding means can release the element by being drawn off from the element oblique to the joining direction. This embodiment makes it possible to perform the operation of 'withdrawing' the joining system head from the element joined to the part by means of the robot alone. A carriage for guiding a completely rectilinear return motion is then not required. In that sense, this embodiment also contributes to a smaller axial extent of the welding head.

It is especially preferred, however, if the jaws are movable far enough away from each other so that the holding means can release the element by being swung away from the element about an axis of rotation oriented transverse to the joining direction. In this embodiment, the jaws can be moved away from each other far enough so that the joining tool need not be withdrawn in joining direction. Rather, it is possible after the joining operation to withdraw the joining tool transverse, in particular perpendicular, to the joining direction, the element being passed between the jaws of the holding means. In this embodiment, consequently, no axial motion is required.

In this way it is possible to pass the carrier with joining tool arranged on the anterior end portion through even extremely small openings, and execute joining operations inside of cavities. The carrier, after attaining the joining position, can remain positioned almost without change. After the joining operation, the joining tool is moved, in particular swung, away transverse to the joining direction, and then the carrier can be withdrawn from the cavity again along its longitudinal axis.

Further, this embodiment makes it possible for the elements to be grasped in especially simple manner by the transfer station. The joining tool is so moved, in particular swung, in this embodiment, that the holding means with released jaws is aligned with an element at the transfer station. Then the element is grasped by the jaws, and taken out of the transfer station by a motion, in particular a swinging motion.

In general, it is preferred if a jaw actuator is provided, actively opening and/or closing the jaws. In this embodiment, as a rule the jaws are configured as rigid fingers. The jaw actuator ensures that the jaws are either actively opened, to release an element, or else actively closed, to hold the element.

Alternatively to this, it is possible to configure or mount the jaws elastically, so that they are passively movable towards and/or away from each other. In this embodiment, the jaws may either be made of an elastic material, in which case other elastic means are superfluous as a rule, or else the jaws may be configured as rigid elements and elastically mounted. It is also possible, within the scope of this embodiment, for the jaws to be elastically pre-stressed, either in holding or in releasing direction. In that case, as a rule an actuator is provided, which actively moves the jaws in the respective other direction.

In general, in an especially preferred embodiment, the transfer station is arranged on the longitudinal carrier. In this way it is possible to achieve a fixed relative position of the transfer station with respect to the joining tool. Besides, it is advantageous for the cross section of the carrier to be smaller as a rule than the cross section of the joining tool, so that space will be available for the transfer station.

Further, it is generally of advantage if the feeding means comprises a magazine for elements. In this way, it is possible always to place an element in readiness to be 'grasped' at the transfer station.

In the joining system according to the invention it is of advantage if a stationary individuating means conveys individual elements all the way to the transfer station of the joining welding head. This embodiment serves in general to enhance the degree of automation. Such stationary individuating and feeding means are known per se in the prior art. However, they convey individuated elements all the way to the holding means in one step, whereas in the joining system according to the invention, a conveyance takes place only as far as the feeding means (transfer station). Thence the holding means 'fetches' an element conveyed thither. It will be understood that the features mentioned above and those yet to be illustrated may be employed not only in the combination specified in each instance but also in other combinations or by themselves, without departing from the scope of the present invention.

BRIEF DESCRIPTION OF THE DRAWINGS

Embodiments of the invention are represented in the drawing by way of example and will be illustrated in more detail in the description to follow. In the drawing.

FIG. 2 shows an alternative conformation of a joining system according to the invention;

FIG. 3 shows a longitudinal section of an embodiment of a holding means;

FIG. 4 shows a cross-section at the line IV-IV in FIG. 3;

FIG. 5 shows the end portion of a joining system head according to the invention, with an alternative conformation of a joining tool;

FIG. 6 shows a view of the end portion of the joining system head of FIG. 5 from below;

FIG. 10 shows a schematic representation of still another alternative embodiment of a transfer station of a joining system head according to the invention;

FIG. 11 shows a schematic sectional view at the line XI-XI in FIG. 10; and,

FIG. 12 shows a schematic side view of an alternative embodiment of a joining system head according to the invention.

DETAILED DESCRIPTION

Figure 1:
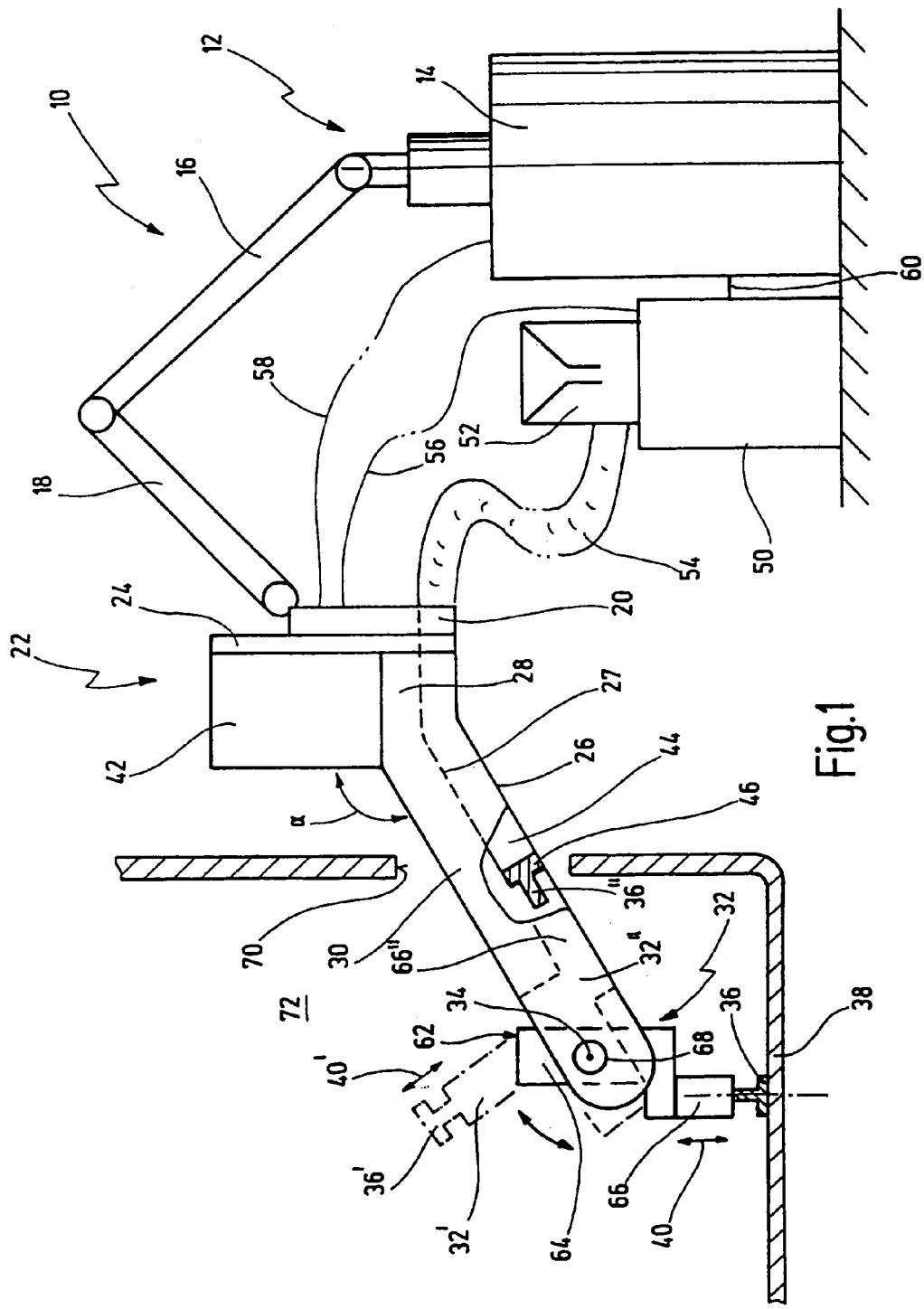
FIG. 1 shows a schematic view of a joining system according to the invention.

In FIG. 1, a joining system according to the invention is generally designated 10. The joining system 10 comprises a robot 12. The robot 12 contains a stationary base 14 from which two arms 16, 18 extend, articulately connected to each other. At the end of the arm 18, a flange 20 is provided.

To the flange 20, a joining system head is attached, generally designated 22 in FIG. 1. The joining system head 22 comprises a baseplate 24 attached to the flange. From the baseplate 24, an elongated carrier 26 extends. The elongated carrier 26 comprises a first short carrying segment 28 and an adjoining second elongated carrying segment 30. The second carrying segment 30 is bent off from the first carrying segment 28 by an angle α of 120°. The angle α is preferably between 60° and 80° or between 100° and 120°. In general, however, it is also conceivable that the first carrying segment 28 and the second carrying segment 30 may be oriented on an axis with each other. The axis of the second carrying segment 30 is designated 27 in FIG. 1.

At the end of the second carrying segment 30, a joining tool 32 is mounted rotatable about an axis 34. The axis of rotation 34 extends perpendicular to the axis 27 of the second carrying segment 30 and, in the embodiment shown, is oriented about parallel to the baseplate 24.

The joining tool 32 serves to weld an element, in particular a welding bolt 36, to a part, in particular a metal sheet 38. Although the joining system may be employed for numerous kinds of joining as a matter of design, a conformation of the joining system as a bolt-welding system, or short-time arc-welding system with lift ignition, is especially preferred. In the following, therefore, without loss of generality, the joining system will be referred to as a bolt welding system and the joining system head 22 as a bolt welding head. The joining tool 32 will be referred to as a welding tool 32. The welding tool 32 welds the bolts 36 to the part 38 in a linear motion (joining direction 40).

The welding head 22 further comprises a control means 42. The control means 42 is provided at the initial portion of the elongated carrier 26 and, in the embodiment shown, is mounted on the first carrying segment 28, to wit next to the baseplate 24. The control means 42 serves to drive the joining tool 32 and as intersection with superordinate control devices.

The welding head 22 further comprises a feeding means 44. The feeding means 44 serves to pick up bolts by the shank in advance from a feed hose and place them in readiness at a transfer station 46. The feed means 44 is consequently configured essentially as a tube or hose and extends along the elongated carrier 26. The transfer station 46 is located in a mid-portion of the second carrying segment 30. In it, one element at a time is placed in readiness for transfer to the welding tool 32. This element is designated 36" in FIG. 1.

The welding system 10 further comprises a stationary base station 50. The base station 50 serves to furnish energy for welding to the welding head 22 and serves as superordinate control device. The base station 50 is connected to an individualizing device 52. The individualizing device 52 serves to individualize bolts, as a rule supplied in bulk, and convey them to the feeding means 44 individually by way of a hose 54. For this purpose, the individualizing device 52 as a rule comprises a compressed air unit to convey the elements 36 pneumatically.

Further, FIG. 1 shows a line 56 connecting the base station 50 to the welding head 22. The line 56 is generally embodied as a system of lines, and includes lines to carry the welding current, control lines etc. Further, FIG. 1 shows a line 58 connecting the welding head 22 to the base 14 of the robot 12. The line 58 is optionally provided and contains one or more control lines. By means of the control lines 58, the motions of the robot 12 can be matched with those of the welding tool 32.

Alternatively or additionally, the base 14 of the robot 12 is connected to the base station 50 by way of a line 60. Hence it is possible also for the matching to take place between robot 12 and welding head 22 by way of lines 60, 56. The lines 56, 58 are passed to the control means 42, whence some are looped to the welding tool 32 (for energy supply to unit there), others are utilized directly.

The welding tool 32 comprises a housing 62 rotatably mounted on the axis 34. At the housing 62, a joining drive means 64 is provided in the form of a linear motor 64. The linear motor 64 serves to move a holding means 66 projecting from the housing 62 perpendicular to the axis of rotation 34 for holding one bolt 36 at a time. The linear motor 64 therefore constitutes a lifting means for executing lift and dip motions in the course of a bolt welding operation, as described in the introduction.

Further, at the end portion of the second carrying segment 30, a rotary drive 68 is provided, serving to rotate the welding tool 32 under control into any angular positions in relation to the second carrying segment 30. The rotational range is typically at least 270°, commonly 360°. The rotary drive 68 serves firstly to rotate the welding tool 32 into a suitable welding position in each instance, one of which welding positions is shown in solid lines in FIG. 1. An alternative welding position is indicated by dot-dash lines at 32'. In the further welding position, the welding tool 32' is employed along a welding direction 40' to weld a bolt 36' to a part not explicitly shown.

Further, the rotary drive 68 serves as loading drive means. For this purpose, the welding tool 32 is turned into a position shown dotted in FIG. 1. In this position, the holding means 66" is oriented flush with the transfer station 46, and is able in that position to grasp a bolt 36" there held in readiness and take it over for a subsequent welding operation.

Although, in the embodiment represented, the loading drive means is constituted by the rotary drive 68 alone, for example an electric motor, modifications of this are conceivable. Thus the loading drive means may for example be constituted in that the—non-rotatable—welding tool 32 is shifted in lengthwise direction on the carrier 26, to mention one example. It will be understood that then the transfer station 46 would have to be arranged correspondingly in a different place.

It is easily seen that the welding tool 32 may be configured with very small dimensions. In the first place, the welding tool 32 is spatially separated from the control means 42. In the second place, the welding tool 32 is decoupled from the pneumatic bolt-feeding means. So no pneumatic or hydraulic lines need be flanged to the welding tool 32. The supply of electricity to the linear motor 64 and/or the rotary drive 68 is comparatively easy to arrange. The same applies to the actuation of the holding means 66, insofar as it is actively actuated electrically.

Since the bolts 36 are put into the holding means 66, not from behind but from in front, no loading pin is required as in the prior art. Therefore the welding tool 32 can be compact in axial direction. It will be understood that instead of a linear motor as joining drive means 64, alternatively a combination of a spring and a solenoid may be provided. Further, it will be understood that the rotary drive 68 may be configured as an electric step motor having a precision of <1°, better yet 0.5°.

The parameters assigned to the rotary motion relate firstly to a welding program and secondly to a program of robot motion. Each welding position has its own welding program and its own robot motion program. By referring the parametric data to the several welding and robot motion programs, it is ensured that firstly the bolt 36 will always be perpendicular to the surface of the part 38, and secondly the welding tool 32 will be in a position in the robot motion affording the robot maximal freedom of motion on the way to the welding position. The control of the rotary motion of the welding tool 32 may be effected by way of the base station 50 and/or by way of the base 14 of the robot 12.

The oblique angling of the second carrying segment 30 with respect to the first carrying segment 28 offers, firstly, an improved interference edge clearance. Secondly, the feeding means 44 is easier to construct, since the bolts, as shown, are held at the transfer station 46 by gravity and/or blown air.

FIG. 1 further shows that the part 38 has the conformation of an angle part having a relatively small aperture 70. Viewed from the robot 12, the desired welding position is located inside of a cavity 72. It is easily seen that the bolt welding system 10 according to the invention is quite especially well-suited to accomplish this object. To introduce the second carrying segment 30 through the opening 70, the welding tool 32 can be turned into a position in which it is largely flush with the second carrying segment 30, for example the position 32" in FIG. 1.

After introduction into the cavity 72, the welding tool 32 is turned into the welding position indicated by solid lines. Before that, a bolt 36 is picked up from the transfer station 46, so that it is located in the holding means 66. Then, in per se conventional manner, a bolt welding operation is carried out, as explained in the introduction.

As remains to be set forth in detail below, the holding means 66 is preferably of such configuration that it can release the welded-on bolt 36 in a direction transverse to the welding direction 40. Consequently, it is possible to turn the joining tool 32 immediately after welding back into the flush position 32", with no need for the second carrying segment 30 to execute a motion in the welding direction 40. As soon as the flush position 32" has been reached, the second carrying segment 30 can be withdrawn again through the opening 70. The robot 12 then carries the welding head 22 to the next welding position. The axis of rotation 34 constitutes an additional axis of rotation for the robot 12. Hence the positioning in a welding position can be accomplished in simpler manner. This the more so as the additional axis of rotation is located near the welding position.

Another advantage of the welding system 10 according to the invention results as follows. In the prior art, the welding head as a whole was interference-edge relevant. In the prior art, therefore, no pneumatic valves were provided on the welding head. But this occasioned very complicated cabling between the base station 50 and the welding head 22.

Owing to the spatial separation of the control means 42 from the welding tool 32 at the welding head 22, the control means 42 itself is not interference-edge relevant. Consequently valves can be integrated into the control means 42 at the welding head 22, so that the number and complexity of the supply lines can be reduced. Since the control means 42 is provided at the welding head 22, no great outlay of electric cabling is needed between welding head 22 and base station 50. For example, it is possible for the supply lines 56 in a hose pack to contain only a welding cable, two auxiliary voltage supplies for the linear motor and a 24-volt supply for the control means, two light guides for serial transmission of measurement and control data and the feed hose 54. In an enlarged version, the hose pack might be supplemented by a protective gas supply line and/or a jet-suction line, for example for color marking. Hence the hose pack can be lighter in weight, torsionally less rigid and therefore more secure.

Besides, the uncoupling of supply means 44 and welding tool 32 makes it possible for the bolts 36 to be fed to the transfer station 46 parallel with the bolt welding operation. In the prior art, bolt feeding and bolt welding are strictly serial. Therefore cycle periods of <1 second are attainable only with great difficulty and under special boundary conditions.

According to the invention, immediately after removal of a bolt from the transfer station 46 to initiate a bolt welding operation, another bolt can be conveyed from the individualizing device 52 by way of hose 54 and feed means 44, to the transfer station 46. This can be accomplished while the welding tool 32 is performing a bolt welding operation.

Also, as the carrier 26 moves from one welding position to the next, the welding tool 32 can be swung to the transfer station 46 and then swung into the right setting for the new welding position. This parallelism also generally ensures that welding cycle periods of definitely less than 1 second are attainable. Although the elements to be welded may basically be of any shape, yet elements feedable by means of compressed air, in particular rotationally symmetrical elements, are especially suitable for processing by the joining system according to the invention. The further welding position 32' may for example be an overhead position, like the position 32' shown. This can be attained without need to rotate the carrier 26. This avoids overstraining the supply cable and hoses.

In the following description and details and modifications of the joining system shown in FIG. 1, like or similar elements are designated by the same reference numerals. Identical designation generally implies like or similar mode of operation, unless expressly otherwise noted below. Where individual elements of the joining system are discussed, it may be assumed that the function is otherwise identical or similar to the function of the joining system 10 of FIG. 1. Further, it will be understood that subsequent references to welding systems, heads or tools are intended to refer generally to such elements for joining, including for example riveting or bonding processes.

FIG. 2 shows an alternative embodiment of a welding head 22. In contradistinction to the welding head 22 of FIG. 1, a rotary drive 68' is provided to rotate the welding tool 32, not in the end portion of the second carrying segment 30, but in the region of the control means 42. The rotary motions of the rotary drive 68' are transmitted to the welding tool 32 by means of a belt drive 80. The belt drive 80 runs along the elongated carrier 26. The elongated carrier 26 is formed in the representation of FIG. 2 by two parallel arms, between whose end portions the welding tool 32 is rotatably mounted.

FIGS. 3 and 4 represent an embodiment of a holding means 66. The holding means 66 comprises a housing 84, in turn comprising an opening 86 facing downward in the joining direction. The holding means 66 comprises two jaws 88A, 88B mounted with limited swingability on the housing 84 and made of an essentially inelastic material. The jaws 88A, 88B form a tongs, an element 36 being grasped between the ends of the jaws 88A, 88B with a predetermined force.

The jaws 88A, 88B are each connected in one piece with a lever segment 92A, 92B. With respect to axes 90A, 90B on which the jaws 88A, 88B are mounted, the lever segments 92A, 92B extend in the respective other direction. The lever segments 92A, 92B are here bent off relative to the joining direction 40, so that they overlap. By pressure on the lever segments 92A, 92B from above (in the representation of FIG. 3), the jaws 88A, 88B are consequently moved away from each other, releasing the bolt 36. This is shown for the jaw 88A in FIG. 3. It may be seen that the jaw 88A releases the bolt 36 completely in the direction transverse to the joining direction 40 (that is, in FIG. 3, out of the plane of the paper). Consequently the holding means 66 with opened jaws 88A, 88B can be moved transverse to the joining direction 40 and perpendicular to the plane of the jaws 88A, 88B without touching the bolt 36. The direction of motion of the jaws 88A, 88B in this operation is designated 93 in FIG. 4.

To actuate the lever segments 92A, 92B, an actuator 94 is provided, preferably triggered electrically. The actuator 94 opens and closes the jaws 88A, 88B actively in each instance. It will be understood that for this purpose the actuator 94 must be configured as a two-directional drive.

Active actuation of the jaws 88A, 88B has the advantage that the bolt 36 can be held with a defined force (for example 20 newtons). The derivation of the holding force from the elasticity of the several fingers of the tongs, as in the prior art, is dispensed with. Consequently a definitely longer service life can be attained. The direction of actuation of the actuator 94 is shown at 96 in FIG. 3. At their ends, the jaws 88A, 88B are of such conformation that they can securely grasp the bolt 36 in question. For this purpose, it may be appropriate to place suitable adapters on the jaws 88A, 88B, in order to fit different bolts 36.

From the under side of the housing 94, as shown in FIG. 3, a positioning pin 98 extends. The positioning or contact pin 98 is rigidly connected to the housing 84. It serves, when a bolt 36 is picked up from the transfer station 46, to ensure that the bolt 36 will occupy a defined position in relation to the holding means 66, and as a stop to assume the axial forces in welding.

The two-directional active actuator can consist of a pneumatic or hydraulic drive. Preferably, however, it consists of a combination of two electromagnets, or of an unregulated linear motor on the 'moving coil' or 'moving permanent magnet' principle. Further, it is possible to configure the actuator 94 as semi-active. Then the opening of the jaws 88A, 88B is effected for example by an electromagnet. When this is switched on, suitably arranged springs serve to ensure that a bolt 36 will be grasped by the jaws 88A, 88B with a defined force.

For welding, the jaws 88A and/or 88B are supplied with welding current, conducted to the bolt 36. The defined force provides for a secure, low-wear passage of current. For this reason, it will be understood that the jaws 88A, 88B will be made of a conductive metal. The positioning pin 98, however, should be non-conductive, or insulated from the housing 84.

Alternatively to an active or semi-active holding means 66, it is possible also to provide jaws of elastic configuration, permitting a lateral introduction of the bolt 36 between them (in the direction 93) and releasing them without substantial exertion of force upon motion transverse to a welded-on bolt 36. In FIG. 3, the longitudinal axis of the holding means 66 is designated 100.

In FIGS. 5 and 6, an additional alternative embodiment of a welding tool 32 is shown. The welding tool 32 comprises a tool housing 102 to which a linear motor 104 of a joining drive means 64 is fixed. The axis or centerline of the linear motor 104 is shown at 105. It is represented that the axis 100 of the holding means 66 and the axis 105 of the linear motor 104 are spaced at a distance d from each other. In this way the holding means 66 is shifted out of the projection of the linear motor 104 in joining direction. This makes it possible to position the holding means 66, and therefore a held bolt 36, closer to an interfering wall or edge. Upon the whole, this enhances the flexibility of the welding head 22.

The linear motor 104 comprises an armature segment 106 connected to a guide plate 108 extending transverse to the joining direction. From the guide plate 108, two guide rods 110, 112 extend, arranged diagonally in relation to the linear motor 104. The guide rods 110, 112 ensure that the guide plate 108 is guided free from tilt. From the under side of the guide plate 108, the holding means 66 extends. An actuator to actuate the hold means 66 may for example be configured on top of the guide plate 108 or integrated therein.

In FIG. 6, it is shown that the carrier 26 is made up of a comparatively massive carrying arm 116 and a less massive tension arm 118 extending parallel thereto. The welding tool 32 is mounted between the arms 116, 118 along the axis of rotation 34. In FIG. 6, current cables 120 to supply current to the jaws 88A, 88B are also indicated.

Figure 7:
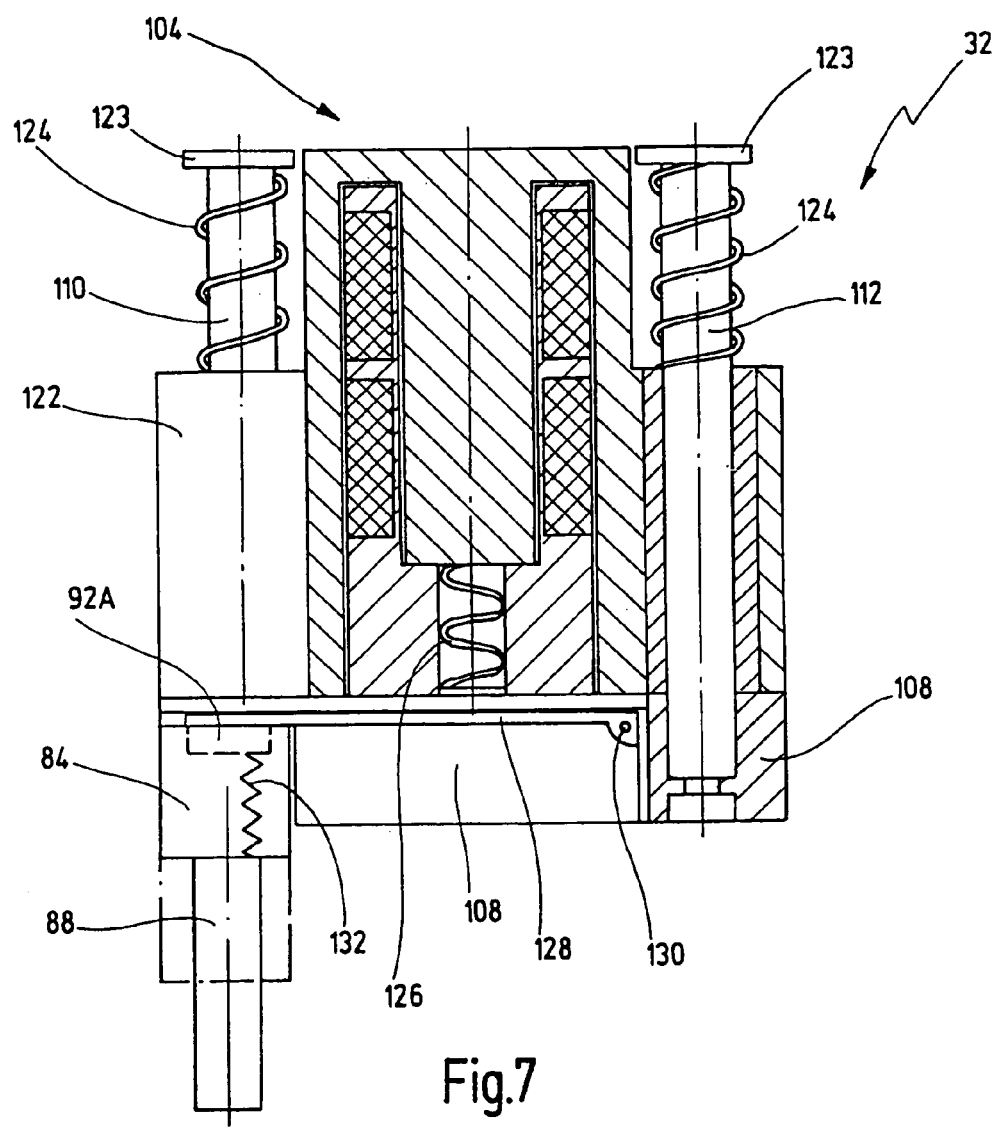
FIG. 7 shows another alternative embodiment of a joining tool of a joining system head according to the invention.

Another alternative conformation of a joining tool 32 is shown in FIG. 7. The welding tool 32 comprises a linear motor housing 122. At the tops of the guide rods 110, 112, flanges 123 are provided in each instance. Between the flanges 123 and the linear motor housing 122, compression springs 124 are arranged, configured around the guide rods 110, 112. The linear motor 104 is consequently so pre-stressed by the compression springs 124 that the guide plate 108 moved thereby is located in the retracted, to with not extended, position. In addition to the compression springs 124 or alternatively thereto, an additional compression spring 126 may be provided inside of the linear motor housing 122.

Further, it is shown that on top of the guide plate 108, a hinged magnet 128 is articulated to an axis 130. The magnet 128 serves to press the lever segments 92A, 92B downward to open the jaws 88. In general, however, the lever segments 92 are pre-stressed towards the closed position of the jaws 88 by means of a tension spring 132.

Figure 8:
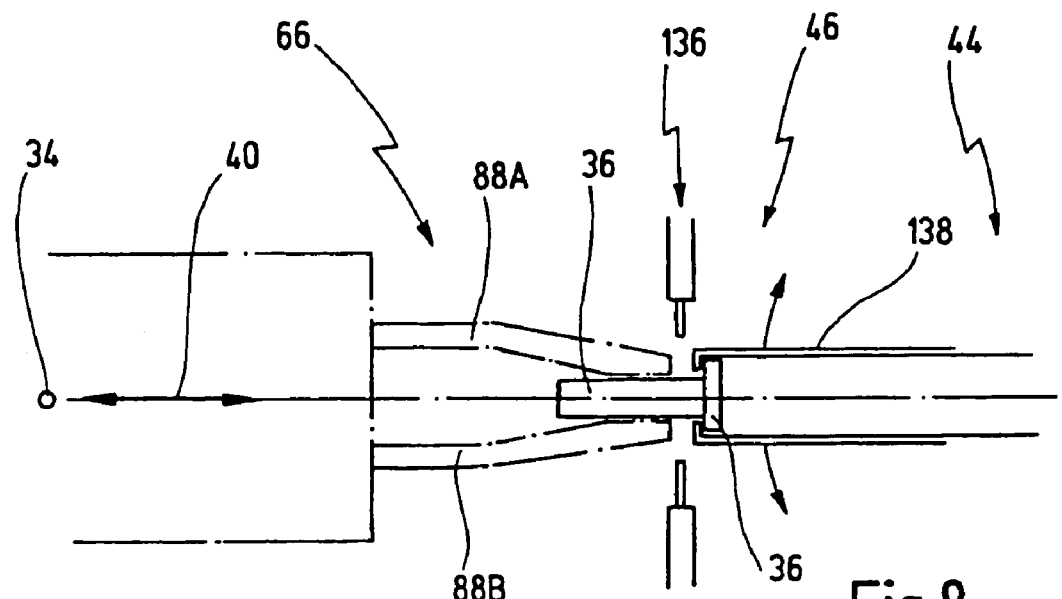
FIG. 8 shows a schematic representation of a transfer station of a joining system head according to the invention.

FIG. 8 shows a first embodiment of a transfer station 46 of the feeding means 44. At the transfer station 46, two opposed sensors 136 (for example a light barrier) are provided, detecting whether there is a bolt 36 in the transfer station 46 or not.

The feeding means 44 consists essentially of a tube or hose 138, bent off inward in the region of the transfer station 46. The bolts 36 are fed shank first from the individualizing device 52 through the feeding means 44. Consequently the head of the bolt 36 will strike the rolled edge of the tube 138 and remain so in the transfer station 46. Thus the shank of the bolt 36 protrudes from the tube 138.

The holding means 66 can now be run with opened jaws 88A, 88B all the way to the bolt 36 and grasp it. Then the holding means 66 is swung back again, out of the plane of the paper in the representation of FIG. 8. It will be understood that at the transfer station 46, a suitable lateral recess must be provided in the tube 138, though not explicitly shown in FIG. 8.

Figure 9:
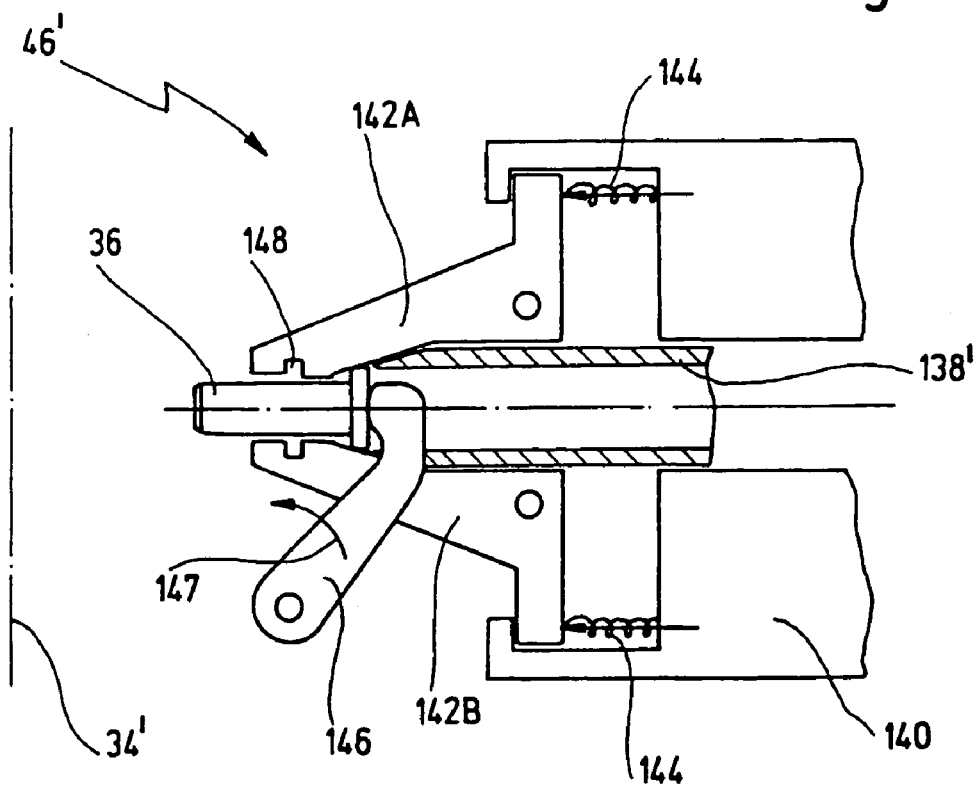
FIG. 9 shows a schematic representation of an alternative transfer station of a joining system head according to the invention.

An alternative embodiment of a transfer station 46' is shown in FIG. 9. In this embodiment a tube 138' of the feeding means 44' is open towards the end. At a transfer housing 140, two clamping jaws 142 are rotatably mounted. The jaws 142 are pre-stressed by means of two springs 144 into a position where their inner sides block the exit of a bolt 36 from the tube 138'. The bolt 36 is braked thereby upon being fed. Here a positioning lever 146 is swung laterally out of the representation shown in FIG. 9 to let the bolt 36 through. Then the positioning lever 146 is swung, as indicated at 147. Thus the bolt 36 presses the jaws 142A, 142B apart and is shifted away from the tube 138' until the head of the bolt 36 snaps into an annular recess 148. The annular recess 148 is formed by the inner sides of the jaws 142A, 142B. In this position, the bolt 36 is definitely held with a certain force. The holding means 66 may, as in FIG. 8, grasp the shank of the bolt 36 and pull it laterally out of the annular recess 148.

Over the embodiment of FIG. 8, this embodiment has the advantage that the bolt 36 is in a defined position in the transfer position 46', and is held with a defined force, so that a secure hold on the bolt 36 by the holding means 66 is ensured. It will be understood that at the transfer station 46' also, suitable sensors may be provided to detect a bolt 36 in the transfer position.

A third embodiment of a transfer station 46" is shown in FIGS. 10 and 11. In this embodiment, the bolts 36 are conveyed by way of a tube 138" into a bolt receptacle 154 of a swingable rotational segment 152. The segment 152 is rotatable about an axis 153 oriented transverse to the axis of the tube 138" and transverse to the orientation of the bolt 36 in the transfer position.

In FIGS. 10 and 11, the segment 152 is in a transfer position. In this position, a pneumatic cylinder 156 serves to push the bolt 36 by means of a plunger 158 between two tension jaws 160, between which the bolt 36 is then hold in a defined manner. Then the segment 152 is turned back to pick up another bolt 36 in the receiving position shown dotted, flush with the tube 138". This embodiment has the advantage that the bolts 36 can be conveyed at high speed through the tube 138". Hence short cycle periods can be achieved.

Another embodiment of a welding head according to the invention is generally designated 170 in FIG. 12. The welding head 170 comprises, at the anterior end of the carrier 26, a welding tool 171 comprising only a housing rotatably mounted on the carrier 26 and a holding means 172 fixed thereto. The welding tool 171 is not provided with a welding drive motor, in particular not a linear motor.

The holding means 172 comprises two jaws 174 between which a bolt 36 is so held that it is oriented tangential to a circumference around the axis of rotation 34. In other words, a joining operation does not occur along a rectilinear motion, but along a circular path. The corresponding direction of guidance is indicated in FIG. 12 as a partial circle 176.

In this embodiment, a rotary drive 175 serves as joining drive means, arranged in the region of the control means 42. Rotary motions of the drive 175 are transmitted by a belt drive 80 to the welding tool 171. It will be understood that the rotary drive 175 is preferably an electric precision step motor with which the difficult movements of the bolt 36 can be executed during a bolt welding operation. The rotary drive 175 thus serves simultaneously also as loading drive, being swung so as to pick up one new bolt 36 at a time from a transfer station 180 of a feeding means 178.

In the feeding means 178, the bolts 36 are not fed successively but side by side, in such manner that the holding means 172 can grasp the bolts 36 transverse to their own extent. It will be understood that the feeding means 178 may either comprise suitable means of converting the lengthwise motion out of the individualizing device 52 into the transverse orientation shown in FIG. 12, or alternatively it is possible to feed the bolts 36 out of the individualizing device 52 already in transverse position.

Further, in FIG. 12 schematically a magazine 186 provided on the carrier 26 is provided. The magazine 186 may serve as supply magazine for a plurality of bolts 36, then to be transferred by means of a suitable integrated individualizing device to the feeding means 178, or to the transfer station 180. It will be understood that such a magazine may also be employed in the embodiments of FIGS. 1 to 11 instead of a stationary individualizing device 52 or in addition thereto.

The invention claimed is:

1. A welding apparatus comprising:
multiple depositable elements;
a robot having at least one joint between elongated, structural and movable members;
a welding tool coupled to one of the structural members by a second joint, the second joint allowing automatic movement of the tool independent from the structural members, the tool operably welding the elements; and
a control unit connected to the tool, the control unit being movable with at least one of the structural members and the tool being movable independently from the control unit.

2. The apparatus of claim 1, wherein the welding tool comprises a holder operably holding at least one of the elements at a time, and an electromagnetic driver operably moving the element relative to the holder.

3. The apparatus of claim 2, wherein the driver is a linear motor.

4. The apparatus of claim 1, further comprising a feeder and a transfer station, the feeder operably sequentially feeding the elements to the transfer station, the transfer station being movable with at least one of the members.

5. The apparatus of claim 4, wherein the element is transferred to the holder in at least two discrete steps.

6. The apparatus of claim 4, wherein the welding tool includes an element holder, the holder is rotatable relative to the transfer station, the holder automatically grasps the element and moves it from the transfer station and then the holder rotates the element into a joining position.

7. The apparatus of claim 5, further comprising a welding arc being created from at least one of the elements when in the tool.

8. A welding machine comprising:
a robot having at least one joint between elongated structural members;
an arc-welding tool being coupled to one of the structural members;
a depositable element-transfer station movable with at least one of the structural members, and the tool being spaced away from and independently movable from the transfer station;
a depositable element-feeder; and
a tube connecting the feeder to the transfer station, the feeder being substantially stationary and at least a portion of the tube being movable with the transfer station.

9. The machine of claim 8, wherein the arc-welding tool includes a linear depositable element-driver and a set of depositable element retaining jaws.

10. The machine of claim 9, further comprising an automatic actuator operably rotating the arc-welding tool relative to the structural members.

11. The machine of claim 9, wherein the driver is a linear motor.

12. The machine of claim 8, further comprising compressed air causing individualized depositable elements to move through the tube.

13. The machine of claim 8, further comprising a weldable element transferred to the holder in at least two discrete steps.

14. The machine of claim 8, wherein the tool rotates from a joining orientation to a feeding orientation, and the element is fed from the transfer station to the tool when the tool is in the feeding orientation.

15. The machine of claim 8, further comprising an elongated welding head carrier coupling the tool to the one structural member, and an actuator rotating the tool relative to the carrier from a welding orientation to an aligned orientation, the tool being substantially aligned and flush with the adjacent portion of the carrier when in the aligned orientation.

16. The machine of claim 8, further comprising a weldable element directly fed into a distal end of the tool from the transfer station without a hose therebetween.

17. The machine of claim 8, further comprising a weldable element including an elongated shank and a laterally enlarged head, at least a portion of the shank projecting from the transfer station when the head is in the transfer station.

18. A joining system, comprising:
multiple depositable elements;
a robot having at least one joint between elongated structural members;
a fastening tool being coupled to one of the structural members, the tool further comprising an element-holder; and
a feeder unit operably containing the elements;
the elements being automatically and individually transferred from the feeder unit to the holder in at least two discrete steps to allow at least a first one of the elements to be fastened by the tool simultaneously with feeding of at least a second one of the subsequent elements;
each of the elements being fed into an end of the holder from outside the tool.

19. The system of claim 18, wherein the tool includes a driver operably linearly moving the depositable elements and a set of jaws operably retaining the depositable elements.

20. The system of claim 19, further comprising an automatic actuator operably rotating the tool relative to the structural members.

21. The system of claim 19, wherein the driver is a linear motor.

22. The system of claim 18, wherein the elements are elongated and weldable parts.

23. The system of claim 18, wherein the elements are rivets.

24. The system of claim 18, further comprising a welding arc created adjacent at least one of: one of the elements and the tool.

25. The system of claim 18, further comprising a workpiece, wherein at least a portion of the feeder unit is stationary when the structural members are automatically moved, and the end of the holder is adjacent the workpiece when the element is being joined to the workpiece.

26. The system of claim 18, wherein the tool rotates from a joining orientation to a feeding orientation, and one of the elements is fed into the tool when in the feeding orientation.

27. The system of claim 18, further comprising an elongated welding head carrier coupling the tool to the one structural member, and an actuator rotating the tool relative to the carrier from a welding orientation to an aligned orientation, the tool being substantially aligned and flush with the adjacent portion of the carrier when in the aligned orientation.

28. The system of claim 18, wherein the elements are transferred to a location spaced away from the feeder unit and the tool at the end of the first step.

29. The system of claim 18, wherein the elements are pneumatically transferred in the first step and are mechanically transferred in the second step.

30. A joining system comprising:
a robot having at least one joint between elongated structural members;
a joining tool coupled to one of the structural members by a second joint; and
an electrical control unit connected to the tool, the control unit being movable with at least one of the structural members and the tool being movable independently from the control unit.

31. The system of claim 30, further comprising a set of individual metallic elements welded by the tool.

32. The system of claim 31, wherein the tool includes a holder and an electromagnetic driver which advances the elements relative to the holder, the tool is movable in a manner to allow the holder to release the welded-on element in a direction substantially transverse to a welding direction.

33. The system of claim 30, further comprising a rotary drive unit operable to rotate the tool at the second joint.

34. The system of claim 33, further comprising an elongated drive transmission coupling the rotary drive unit to a member associated with at least one of the tool and the second joint, the rotary drive unit being remotely located away from the tool and the second joint, and the rotary drive unit being movable with at least one of the structural members.

35. The system of claim 30, further comprising a set of rivets linearly inserted by the tool.

36. The system of claim 30, further comprising depositable elements and workpieces, wherein the tool operably bonds the elements to the workpieces.

37. The system of claim 30, further comprising an electric step motor operably rotating the tool at the second joint.

38. A joining system, comprising:
an element;
a holder operable to at least temporarily retain the element during joining;
an automatic element driver located adjacent the holder;
a controller connected to and operably controlling the driver, the controller being movable with the holder and the driver in at least one operating condition;
a transfer station spaced apart from the holder; and
a feeder unit spaced apart from but connected to the transfer station, the feeder unit operably transferring the element to the transfer station where its movement is interrupted before being further transferred to the holder.

39. The joining system according to claim 38, further comprising a projecting elongated carrier, the holder being mounted on an end portion of the projecting elongated carrier.

40. The joining system according to claim 39, wherein the holder is movably mounted on the end portion of the carrier and further comprising a loading drive member operable to move the holder to the transfer station in order to transfer the element to the holder.

41. The joining system according to claim 40, wherein the holder is rotatably mounted on the end portion of the carrier and the loading drive member is operable to rotate the holder along a path to the transfer station.

42. The joining system according to claim 40, wherein the loading drive member comprises a motor arranged on the end portion of the carrier.

43. The joining system according to claim 40, wherein the loading drive member comprises a motor positionable adjacent the controller and a transmission that transmits motions of the motor to the holder.

44. The joining system according to claim 43, wherein the motor is a rotary motor and the transmission is a tension transmission.

45. The joining system according to claim 40, wherein the joining drive member comprises a linear electric motor.

46. The joining system according to claim 45, wherein a longitudinal axis of the joining drive member and a longitudinal axis of the holder are parallel to each other.

47. The joining system according to claim 38, wherein the holder comprises a plurality of jaws positioned around a longitudinal axis of the holder, the jaws being movable towards and away from each other, to one of hold and release the element.

48. The joining system according to claim 47, wherein the plurality of jaws comprises two jaws.

49. The joining system according to claim 47, wherein the jaws are movable away from each other to permit the holder to release the element by being drawn off from the element in a direction oblique to an element joining direction.

50. The joining system according to claim 47, wherein the jaws are movable away from each other to permit the holder to release the element by being swung away from the element about an axis of rotation oriented transverse to an element joining direction.

51. The joining system according to claim 47, further comprising a jaw actuator operable to actively move the jaws.

52. The joining system according to claim 47, wherein the jaws are passively movable relative to each other.

53. The joining system according to claim 39, wherein the transfer station is connectable to the elongated carrier.

54. The joining system according to claim 38, further comprising a robot movable on at least two coordinate axes and a joining system head fixed to the robot.

55. The joining system according to claim 38, further comprising a stationary individualizing device operable to convey the element to the feeder unit.

56. The joining system according to claim 38, wherein the feeder unit comprises an element magazine.

57. A joining system, comprising:
an element;
a holder operable to at least temporarily retain the element during joining;
an automatic element driver located adjacent the holder;
a controller connected to and operably controlling the driver, the controller being movable with the holder and the driver in at least one operating condition;
a robot having at least one joint between elongated structural members, the controller being connectable to a first one of the structural members by a second joint;
a transfer station spaced apart from the holder; and
a feeder unit spaced apart from but connected to the transfer station, the feeder unit operably transferring the element to the transfer station where its movement is interrupted before being further transferred to the holder;
wherein the controller is spaced apart from the holder and the driver such that the holder and the driver are movable independently from the controller in another operating condition.

58. The system of claim 57, wherein the element further comprising a weld depositable element operably moved relative to the holder by the driver.

59. The system of claim 58, further comprising a welding arc current operably transferred through the element when the element is retained by the holder.

60. The system of claim 57, wherein the element is transferable to the holder in at least two discrete steps.

61. The system of claim 57, wherein the first one of the structural members is operable to separate the controller from the holder and the driver.

62. The system of claim 57, wherein the holder is movable relative to the first one of the structural members.

63. The system of claim 57, further comprising:
a metallic element;
a workpiece having an opening; and
a stationary base of the robot located on one side of the opening of the workpiece;
wherein the holder is insertable through the opening of the workpiece to join the element to the workpiece on an opposite side of the opening from the stationary base.

64. The system of claim 57, wherein the driver includes an electromagnetic device.

65. The system of claim 57, wherein the driver includes a linearly moving electric motor.

66. An arc welding system comprising:
a weld stud having an elongated shank;
a welding head further comprising an elongated carrier and a welding tool moveably coupled to the carrier, the welding tool including a holder and an electromagnetic actuator operably moving the holder, the holder operably holding the stud during arc welding;
a transfer station movable with the carrier and temporarily retaining the stud at a position spaced from the welding tool;
the welding tool being movable from a welding orientation to a feeding orientation, the holder of the welding tool gripping and removing the shank of the stud from the transfer station when the welding tool is in the feeding orientation.

67. The system of claim 66, further comprising an actuator rotating the welding tool relative to the carrier from the welding orientation to an aligned orientation, the welding tool being substantially aligned and flush with the adjacent portion of the carrier in the aligned orientation.

68. The system of claim 66, wherein the stud includes a laterally enlarged head which is inside the transfer station when the shank projects out of the transfer station immediately prior to gripping of the stud by the holder.

69. The system of claim 66, further comprising a stationary feeder containing multiples of the stud, and a hose connecting the feeder to the transfer station, the studs being fed to the transfer station substantially simultaneously with welding by the welding tool.

70. The system of claim 66, wherein the transfer station includes a magazine containing multiples of the stud.

71. The system of claim 66, wherein the transfer station includes jaws that movably clamp the stud and a sensor operably sensing presence of the stud.

* * * * *